United States Patent [19]

Ilhage

[11] Patent Number: 5,105,303
[45] Date of Patent: Apr. 14, 1992

[54] ARRANGEMENT FOR A TRANSPARENT COVERING ELEMENT WITH AN ELECTROCHROMATIC LAYER

[75] Inventor: Bertil Ilhage, Trollhättan, Sweden

[73] Assignee: Saab Automobile Aktiebolag, Sweden

[21] Appl. No.: 576,480

[22] PCT Filed: Mar. 13, 1989

[86] PCT No.: PCT/SE89/00127
§ 371 Date: Sep. 27, 1990
§ 102(e) Date: Sep. 27, 1990

[87] PCT Pub. No.: WO89/09428
PCT Pub. Date: Oct. 5, 1989

[30] Foreign Application Priority Data

Mar. 30, 1988 [SE] Sweden .................. 8801173

[51] Int. Cl.⁵ .................................... G02F 1/01
[52] U.S. Cl. ........................... 359/273; 359/265
[58] Field of Search ............... 350/374, 388, 393, 407, 350/357; 359/245, 265, 273, 275

[56] References Cited

U.S. PATENT DOCUMENTS

| 4,599,614 | 7/1986 | DeBerry et al. | 350/357 |
| 4,749,261 | 6/1988 | McLaughlin et al. | 350/339 R |
| 4,750,816 | 6/1988 | Ito et al. | 359/266 |
| 4,958,917 | 9/1990 | Hashimoto et al. | 359/275 |
| 5,007,718 | 4/1991 | Minoura et al. | 350/357 |

FOREIGN PATENT DOCUMENTS

| 054233 | 3/1987 | Japan . |
| 209421 | 9/1987 | Japan . |
| 3614547 | 11/1986 | Netherlands . |

Primary Examiner—Bruce Y. Arnold
Assistant Examiner—James Phan
Attorney, Agent, or Firm—Ostrolenk, Faber, Gerb & Soffen

[57] ABSTRACT

A covering element consisting of transparent material is designed with an electro-chromatic layer for control of the transmission of light through the covering element. An electrical power which is required for control of the electro-chromatic layer is obtained from a photo-electric layer integrated in the covering element. The photo-electric layer is arranged outside the electro-chromatic layer. By means of the arrangement, when the light is at its most intensive, a high voltage is obtained from the photo-electric layer and can be transferred to the electro-chromatic layer so as to in this connection reduce, at least to a considerable extent, the transmission through the covering element. The arrangement can, within vehicle technology for example, be used in a sun-roof in order to prevent heating up of an interior space in sunny weather. By means of the arrangement, the transmission is automatically adapted according to the light. The arrangement also leads to the complete elimination of the risk that the vehicle battery will be discharged, since all the energy which is supplied to the electro-chromatic layer is generated in the photo-electric layer.

15 Claims, 1 Drawing Sheet

ARRANGEMENT FOR A TRANSPARENT COVERING ELEMENT WITH AN ELECTROCHROMATIC LAYER

BACKGROUND OF THE INVENTION

The present invention relates to an arrangement for a covering element made from an at least partially transparent base material, which comprises an integrated electro-chromatic layer for electrical control of the light transmission through the covering element.

It is previously known, in different connections, to design glass sheets and other transparent covering elements with electro-chromatic layers, by means of which the light transmission through the glass sheet can be controlled. In this connection the electro-chromatic layer usually comprises two electrically conductive layers, which surround on both sides an ionically conductive layer. By means of exposing the ionically conductive layer, via the electrically conductive layers, to different electrical voltage fields, the light transmission can be controlled through the ionically conductive layer and thus through the whole covering element also. The electrical voltage necessary for the control is usually obtained from a per se conventional voltage source. According to what is stated, for example, in the American patent specification U.S. Pat. No. 4,240,021 which relates to a solar-cell powered clock, a battery can also be used as a voltage source. In this case, inside the electro-chromatic layer, a number of photocells are arranged, which convert the light incident on them into electrical power in order to charge a battery. Since the electro-chromatic layer is arranged outside the photocells, it is possible to control the light incident on the photocells and thus control the electrical power emitted from the photocells. This is used in order to prevent overloading of the battery which is connected to the photocells.

As far as vehicles are concerned, use has been made of electro-chromatic layers in windscreens and other covering elements only in certain prototype cars. The intention in this case is among other things to be able, in sunny weather, to prevent too much sunlight shining into an area to be irradiated by the sunlight, such as, the interior space of the vehicle and thus the associated increase in temperature. This can, however, principally be used during operation of the vehicle when sufficient power is obtained from the generator of the vehicle. The possibilities of preventing an increase in the temperature of the interior space during a long parking time, for example, are limited by the power which is stored in the battery of the vehicle. If parking continues for too long, there is a risk that the battery will be discharged and that as a result of this the vehicle cannot be started.

SUMMARY OF THE INVENTION

The object of the present invention is to overcome this disadvantage of known solutions. The invention thus relates to an arrangement which permits the sun shining into a vehicle to be reduced by means of an electro-chromatic layer in one or more of the covering elements of the vehicle, even when the vehicle is parked for a long time, without the risk of the normal battery of the vehicle being discharged.

This object is achieved according to the invention by a covering element comprising an electro-chromatic layer and an integrated photo-electric layer, outside of the electro-chromatic layer, which converts the light incident on the photo-electric layer into electrical power, and by the photo-electric layer being electrically connected to the electro-chromatic layer and supplying the same with electrical power in proportion to the light which is incident on the photo-electric layer, by means of which the transmission through the covering element is controlled automatically depending upon the incident light.

The arrangement according to the invention permits the electrical power which is required for control of the electro-chromatic layer to be supplied from a separate power source. The electrical power, which is supplied from the photo-electric layer, is proportional to the incident light, which means that the power supply is greatest when the demand is greatest. In this manner, automatic adaptation of power supply and demand is achieved. Furthermore, the integrated construction of an electro-chromatic layer together with a photo-electric layer in the covering element means that a compact and simple construction is obtained.

BRIEF DESCRIPTION OF THE DRAWING

Further features and advantages characterizing the invention emerge from the attached description of an exemplary embodiment of the invention. The description is carried out with reference to the attached drawing, in which.

DESCRIPTION OF A PREFERRED EMBODIMENT

Figure 1:
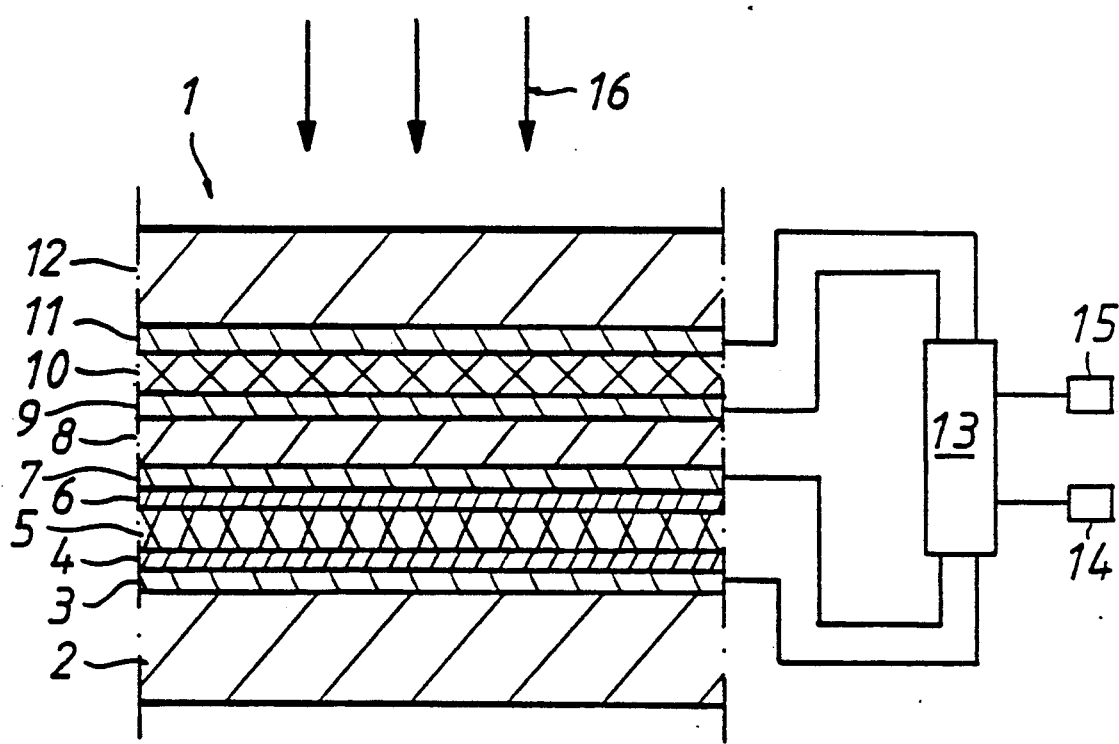
FIG. 1 shows a cross section of a covering element according to the invention and a basic wiring diagram showing how different layers in the covering element are connected to one another.

The attached FIG. 1 shows a cross section of a covering element for a vehicle, for example a passenger car with a closed body. In this example, the covering element is constituted by a sun-roof 1, which is arranged in the roof of the vehicle and which can be opened in order to ventilate the interior space contained within the vehicle. The sun-roof 1 is designed with a frame, in which mechanical elements are fixed for fixing and manoeuvring of the opening and closing of the sun-roof. This frame and the mechanical elements associated with it are designed entirely according to conventional technology and are thus not described further.

The attached FIG. 1 shows a cross section of a part of the sun-roof 1. The lowest part of the sun-roof 1, which corresponds to that part of the same which lies innermost towards an area to be irradiated by sunlight, i.e., the interior space, is made of glass 2. Above this, the sun-roof 1 comprises an integrated electro-chromatic layer 3-7, which consists of a number of film layers arranged one upon the other. The following can be given as an example of how the electro-chromatic layer 3-7 is constructed. At the bottom and against the glass 2, a layer of a transparent conductor 3 is arranged, which consists of indium tin oxide (ITO). Successively arranged above this are a counter-electrode 4 made of molybdenum hydroxide MOH, an ionic conductor 5 made of tantalum oxide TaO, an electro-chromatic electrode 6 made of tungsten oxide $WO_3$ and, at the top, a transparent conductor 7 made of indium tin oxide ITO.

Above the electro-chromatic layer 3-7 an insulating plastic film 8 is arranged, on top of which an integrated photo-electric layer 9-11 is arranged. On the outside, the photo-electric layer 9-11 is covered with glass 12. The photo-electric layer 9-11 also consists of a number of different film layers. In this example, the photo-electric layer 9-11 consists of two film layers of a transparent conductor 9, 11 made of indium tin oxide ITO, between which a thin film layer of an ionic conductor 10 made of silicon material is arranged. In alternative embodiments, it is possible to select other materials and designs of the respective layers. However, as with the layers indicated, types should be selected which are transparent to a greater or less extent. This in itself does not exclude the possibility that completely non-transparent materials can also be used, but these must then be positioned so that at least certain parts of the sun-roof 1 can be considered transparent.

The transparent conductors 3, 7, 9, 11, which constitute the photo-electric layer 9-11 and the electro-chromatic layer 3-7, are connected to one another according to the wiring diagram which is schematically reproduced in FIG. 1. The transparent conductors 3, 7, 9, 11 in both layers are connected to an electrical control unit 13. Also connected to the control unit 13 is an electrical sensor 15 which senses the temperature in the area to be irradiated by the sunlight, i.e., interior space of the vehicle and transmits a signal, which corresponds to this, to the control unit 13. The physical positioning of this sensor 15 can be varied to a large extent and can, for example, be combined with an already existing sensor which forms part of the ventilation system of the vehicle. It is also possible to design the sensor 15 as a separate sensor, which is built into the frame, which surrounds the sun-roof 1, or close to it in the roof of the vehicle.

The control unit 13 is designed to form the link between the respective conductors 3, 7 and 9, 11 of the two layers 3-7 and 9-11 respectively under certain normal operating conditions. Under these conditions, the sensor 15 has no effect in any way. In a simplified form of the invention, therefore, the control unit 13 can be replaced with a connecting wire.

The light incident on the outside of the sun-roof 1, and indicated by three arrows 16 in the FIG. 1, passes, without appreciable hindrance, through the protective outer glass 12. In the photo-electric layer 9-11, there takes place in the ionically conductive layer 10 a flow of ions, which sets up a voltage between the two conductors 9, 11, which voltage is proportional to the incident light 16. The control unit 13 transfers this voltage to the electro-chromatic layer 3-7, that is to say the voltage is applied via the transparent conductors 3, 7 between the electro-chromatic electrode 6 and the counter-electrode 4. The result of this is that the ionic conductor 5, which lies between them, changes, in proportion to the voltage which is applied, its transmission capacity for light passing through. The transmission is in this connection reduced in proportion to an increase in the voltage.

By means of the arrangement, with strong sunlight, a high voltage is obtained from the photo-electric layer 9-11 and is transferred to the electro-chromatic layer 3-7 in order to completely or to a considerable extent prevent the passage of the light 16 through the sun-roof 1. The heating up of the interior space which occurs in the summertime as a result of sun shining in can be reduced considerably by these means. The control of the light transmission through the sun-roof 1 is thus effected completely automatically and simply, depending upon the incident light 16.

The temperature sensor 15, which is arranged in the interior space, is used under certain conditions to modify the described functioning. The control unit is designed so as to control the voltage transmitted between the conductors 3, 7, 9, 11 of the two layers 3-7, 9-11, depending upon the parameter value representing the variable quantity, the interior temperature. The temperature sensor 15 is in this connection used, in the event of low interior temperatures, to reduce the voltage which is transferred via the control unit 13 to the electro-chromatic layer 3-7. In the wintertime, for example, when the interior temperature can assume a low value during parking, there is no need to exclude the sunlight.

The invention can be modified within the scope of the attached claims and designed otherwise than in the manner indicated in the example described. In addition to the exemplary temperature sensor 15, a sensor 14, which senses another variable quantity in the interior space, for example the light incident on the interior space, can also be connected to the control unit 13. Likewise, the control unit 13 can be connected to a manually operable control device, by means of which the transmission through the sun-roof 1 can be manually controlled. The control unit 13 can also be connected to another voltage source (not shown) so as to render control possible also, in a manner known per se, when the power supplied from the photo-electric layer 9-11 is too low. Preferably, the other voltage source should be designed to supply power principally when the vehicle is in operation. It is thus possible, when driving at night, for dazzling light to be excluded from the interior space. The example described relates to a sun-roof 1, but the invention can advantageously be applied to other covering elements within vehicle technology such as windscreens, rear windows, side windows or complete roofs of transparent material.

In the example described general expressions such as light and sunlight are used, with which electromagnetic radiation mainly within and in the vicinity of the entire visible spectrum is principally intended. In alternative embodiments, the invention can be used to control the transmission of radiation within other intervals of the spectrum, both inside and outside the visible range. With regard to the fact that it is to a large extent longwave radiation which conveys heat, it may in certain cases be sufficient to control with regard to this. Further modifications are also possible within the scope of the inventive idea, both within the area of vehicles and other technical areas.

I claim:

1. A covering element adapted for automatically controlling the transmission of incident electro-magnetic radiation through the covering element dependent upon the electro-magnetic radiation incident upon the covering element, the covering element comprising:

an electro-chromatic layer for electrically controlling transmission of electro-magnetic radiation through the covering element to an area to be irradiated by the electro-magnetic radiation, the electro-chromatic layer having an outside which faces the incident electro-magnetic radiation and having an opposite inside which faces toward the area and also having means which are adapted to vary the transmission of electro-magnetic radiation through the electro-chromatic layer dependent upon an electric energy supplied to that layer;

a photo-electric layer at the outside of the electro-chromatic layer, the photo-electric layer being adapted for transmitting electro-magnetic radiation and for converting some of the electro-magnetic radiation that is incident on the photo-electric layer into electric energy;

means electrically connecting the photo-electric layer to the electro-chromatic layer for supplying the electro-chromatic layer with electric energy that is proportional to the electro-magnetic radiation which is incident on the photo-electric layer, for causing the electro-chromatic layer to automatically control the transmission of electro-magnetic radiation through the electro-chromatic layer and the covering element, dependent upon the incident radiation.

2. The covering element of claim 1, further comprising an electrical control unit for controlling the electric energy supplied to the electro-chromatic layer.

3. The covering element of claim 2, further comprising a sensor for sensing a variable parameter in the area that is covered by the covering element, which parameter is dependent upon the amount of electro-magnetic radiation that is incident on the covering element; and means connecting the sensor to the electrical control unit for enabling the electrical control unit to vary the electric energy supplied to the electro-chromatic layer, dependent on the variation in the parameter.

4. The covering element of claim 3, wherein the sensor is a temperature sensor.

5. The covering element of claim 3, wherein the photo-electric layer comprises two electrically conductive layers and an ionically conductive layer between the two electrically conductive layers, the ionically conductive layer being adapted to have a flow of ions therein for setting up a voltage between the two electrically conductive layers.

6. The covering element of claim 3, wherein the electro-magnetic radiation is light within the visible spectrum and the covering element, including the electro-chromatic layer and the photo-electric layer, is normally transparent to visible light.

7. The covering element of claim 5, wherein the electrically conductive layers and the ionically conductive layer of the photo-electric layer are made from at least partially transparent materials.

8. The arrangement of claim 5, wherein the means electrically connecting the photo-electric layer to the electro-chromatic layer comprise the electrically conductive layers of the photo-electric layer being electrically connected to the electrical control unit for providing electric energy to the control unit dependent upon the incident electro-magnetic radiation on the photo-electric layer.

9. The covering element of claim 8, wherein the incident radiation on the ionically conductive layer in the photo-electric layer is adapted to establish an ion flow in that layer for establishing a voltage between the conductors of the photo-electric layer for supplying that voltage to the control unit which in turn supplies a voltage to the electro-chromatic layer for adjusting the ability of the electro-chromatic layer to pass incident electro-magnetic radiation through the electro-chromatic layer.

10. The covering element of claim 5, wherein the electro-chromatic layer comprises a number of film layers arranged one upon the other and includes two electro-magnetic radiation transparent conductors, a second ionically conductive layer between the transparent conductors and a respective electro-chromatic electrode between each of the transparent conductors and the second ionically conductive layer that is between the transparent conductors; and the electro-chromatic layer being comprised of materials that are transparent to the electro-magnetic radiation.

11. The covering element of claim 10, wherein the means electrically connecting the photo-electric layer to the electro-chromatic layer comprise the transparent conductors of the electro-chromatic layer being electrically connected to the electrical control unit so that the electrical control unit supplies a voltage to the transparent conductors and, through the electro-chromatic electrodes at the transparent conductors, supplies the voltage to the ionically conductive layer for changing the ionically conductive layer at the electro-chromatic layer in proportion to the voltage applied to it.

12. The covering element of claim 11, wherein the means electrically connecting the photo-electric layer to the electro-chromatic comprise the electrically conductive layers of the photo-electric layer being electrically connected to the electrical control unit for providing electric energy to the control unit dependent upon the incident electro-magnetic radiation on the photo-electric layer.

13. The covering element of claim 12, wherein the incident radiation on the ionically conductive layer in the photo-electric layer is adapted to establish an ion flow in that layer for establishing a voltage between the conductors of the photo-electric layer for supplying that voltage to the control unit which in turn supplies a voltage to the transparent conductors of the electro-chromatic layer for adjusting the ability of the electro-chromatic layer to pass incident electro-magnetic radiation through the electro-chromatic layer.

14. The covering element of claim 1, wherein the photo-electric layer comprises two electrically conductive layers and an ionically conductive layer between the two electrically conductive layers, the ionically conductive layer being adapted to have a flow of ions therein for setting up a voltage between the electrically conductive layers.

15. The covering element of claim 14, wherein the electro-chromatic layer comprises a number of film layers arranged one upon the other and includes two electro-magnetic radiation transparent conductors, a second ionically conductive layer between the transparent conductors and a respective electro-chromatic electrode between each of the transparent conductors and the second ionically conductive layer that is between the transparent conductors, and the electro-chromatic layer being comprised of materials that are transparent to the electro-magnetic radiation.

* * * * *